United States Patent [19]

Hartmann et al.

[11] Patent Number: 4,718,687
[45] Date of Patent: Jan. 12, 1988

[54] MULTI-AXLE MOTOR VEHICLE WITH A BODY

[75] Inventors: Ernst Hartmann, Alsfeld; Waldemar Stuhr, Aschaffenburg, both of Fed. Rep. of Germany

[73] Assignee: Matra-Werke GmbH, Frankfurt am Main, Fed. Rep. of Germany

[21] Appl. No.: 841,532

[22] PCT Filed: Jun. 26, 1985

[86] PCT No.: PCT/EP85/00311
§ 371 Date: Feb. 24, 1986
§ 102(e) Date: Feb. 24, 1986

[87] PCT Pub. No.: WO86/00270
PCT Pub. Date: Jan. 16, 1986

[51] Int. Cl.⁴ ............................................... B62D 21/02
[52] U.S. Cl. ...................................... 280/104; 280/111
[58] Field of Search ............... 280/104, 788, 111, 780, 280/790; 105/199 A, 413, 414, 417

[56] References Cited

U.S. PATENT DOCUMENTS

| 2,032,657 | 3/1936 | Frederickson | 280/111 |
| 3,506,079 | 4/1970 | Madler | 280/111 |
| 4,128,255 | 12/1978 | Coldren | 280/711 |

FOREIGN PATENT DOCUMENTS

| 79293 | 5/1955 | Denmark | 280/111 |
| 1102445 | 6/1954 | France | 280/111 |
| 1210099 | 9/1959 | France | 280/104 |
| 617790 | 2/1961 | Italy | 280/111 |

Primary Examiner—John J. Love
Assistant Examiner—Karin L. Ferriter
Attorney, Agent, or Firm—Buell, Ziesenheim, Beck & Alstadt

[57] ABSTRACT

Multi-axle motor vehicle, particularly commercial vehicles, preferably a motor vehicle with a body, of which the contents is comprised of instruments, such as a workshop car, the motor vehicle comprising a warp flexible frame (1, 2) and the body being discharged as much as possible of warping efforts: the body, respectively its bottom construction group (8), is supported at least at one end, preferably throughout its length with distribution on several locations and at both ends, on a load distribution curve surface (5), preferably configured as an arc of a circle, connected to the frame (1, 2), the curvature center of the load distribution curve surface (5) being located in the warping axis of the frame (1, 2, 3, 4): at least one side thrust support connection (12) is provided in order to prevent the load distribution surface (6) from sliding on the load distribution curve surface (5).

6 Claims, 29 Drawing Figures

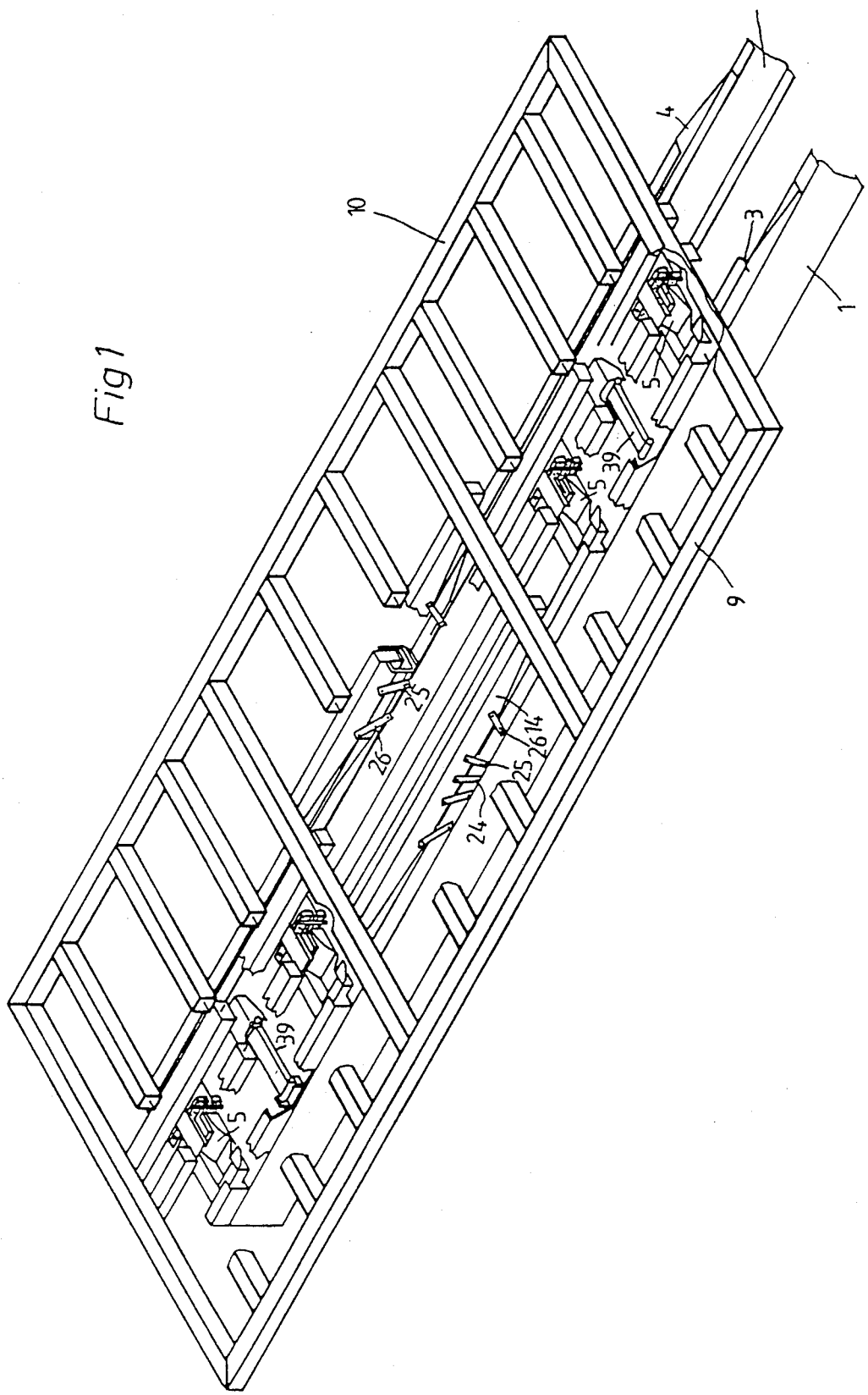

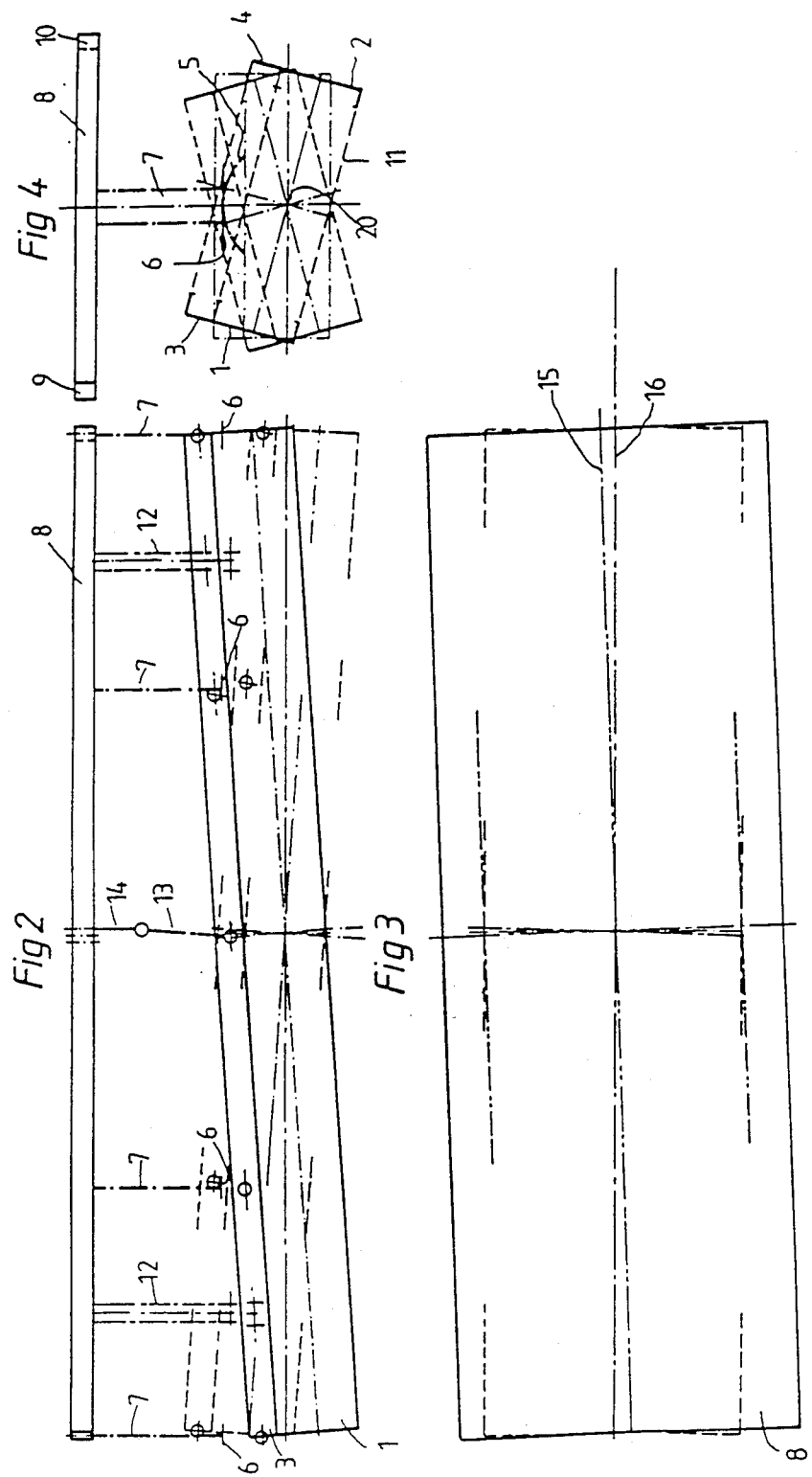

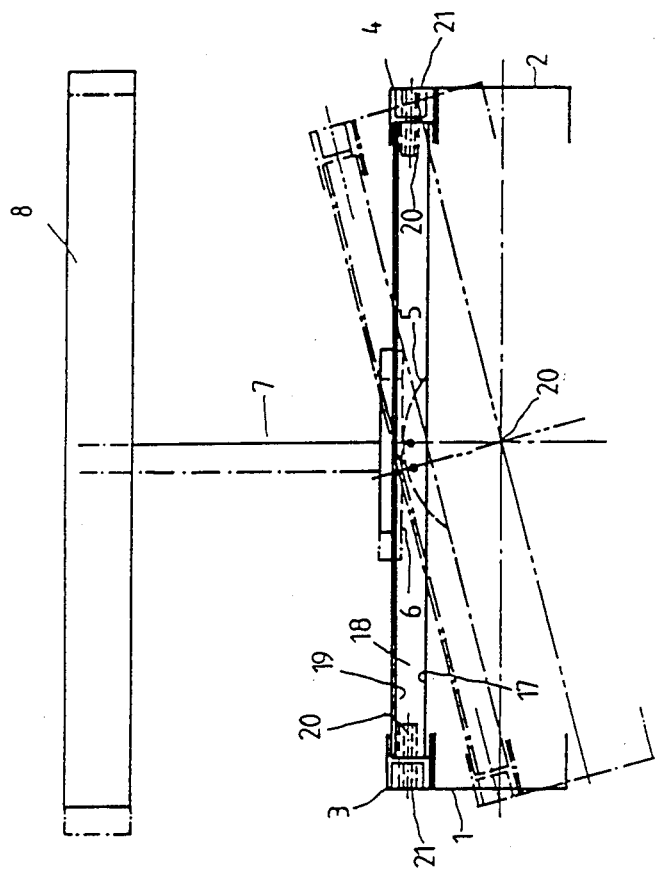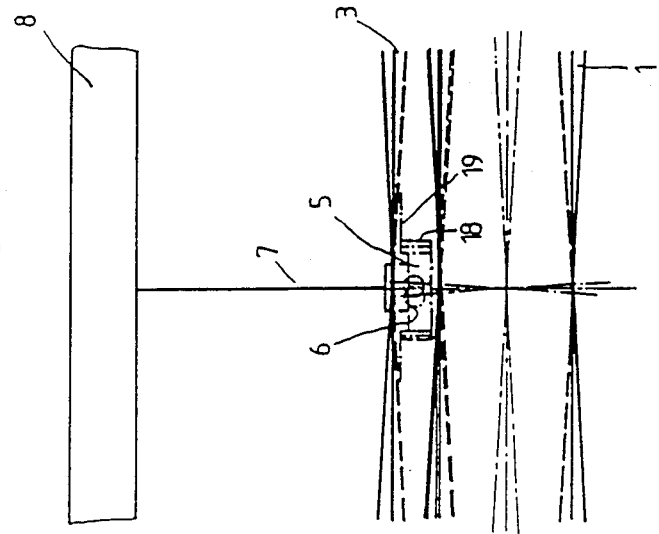

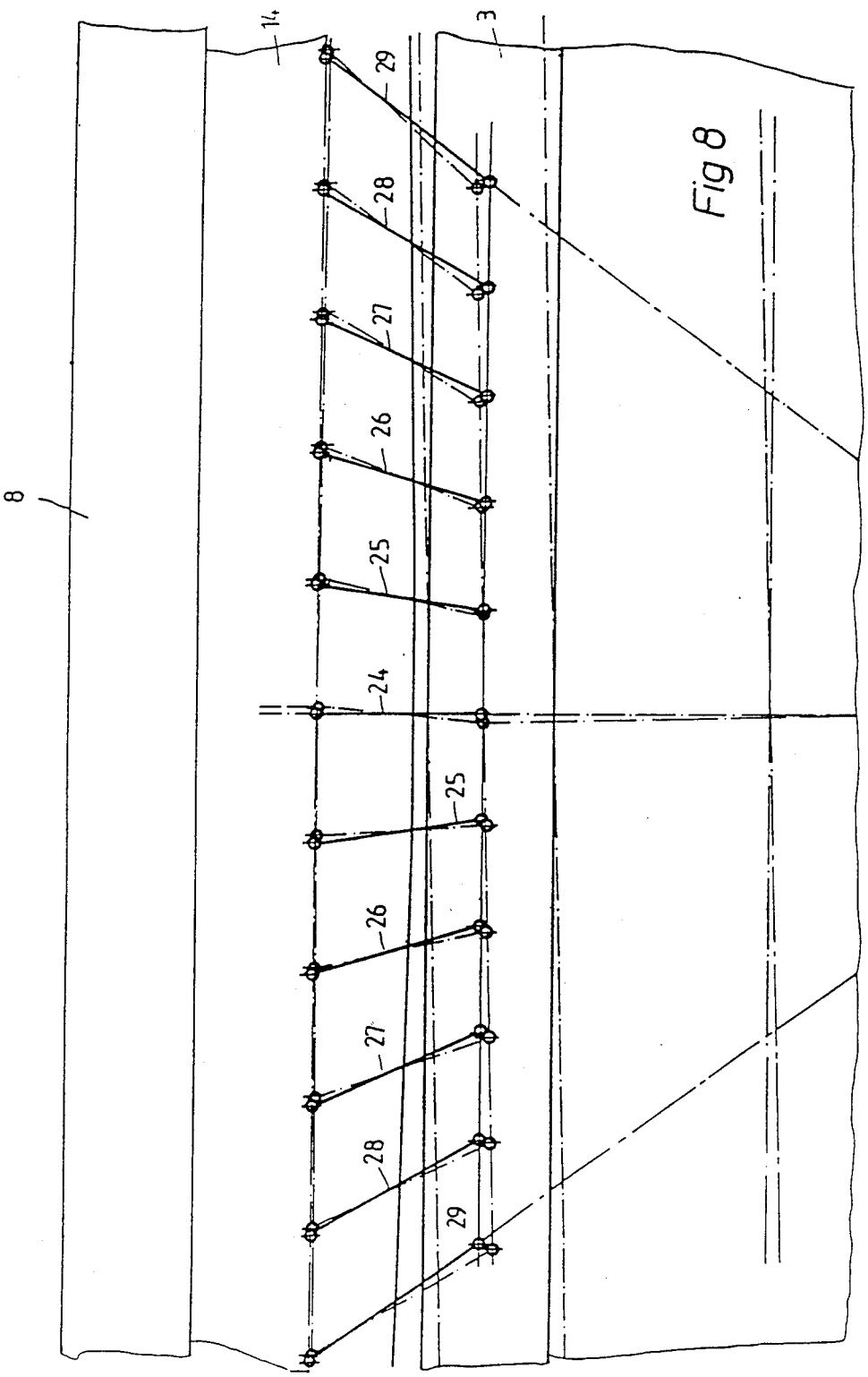

Fig. 18
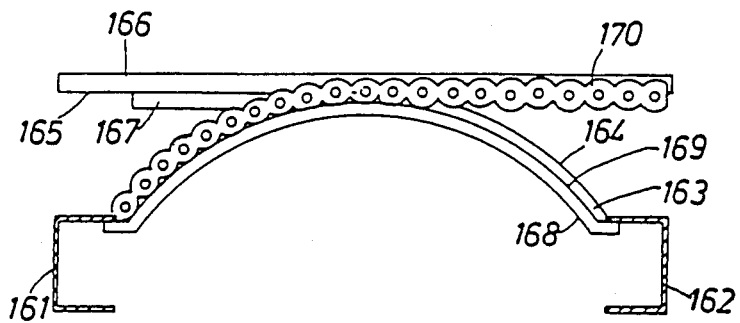
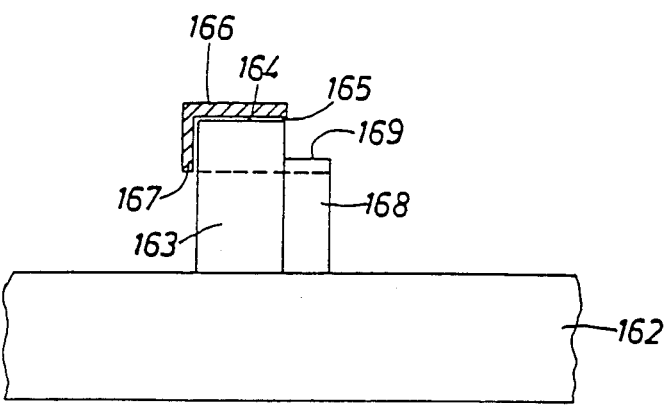
Fig. 19

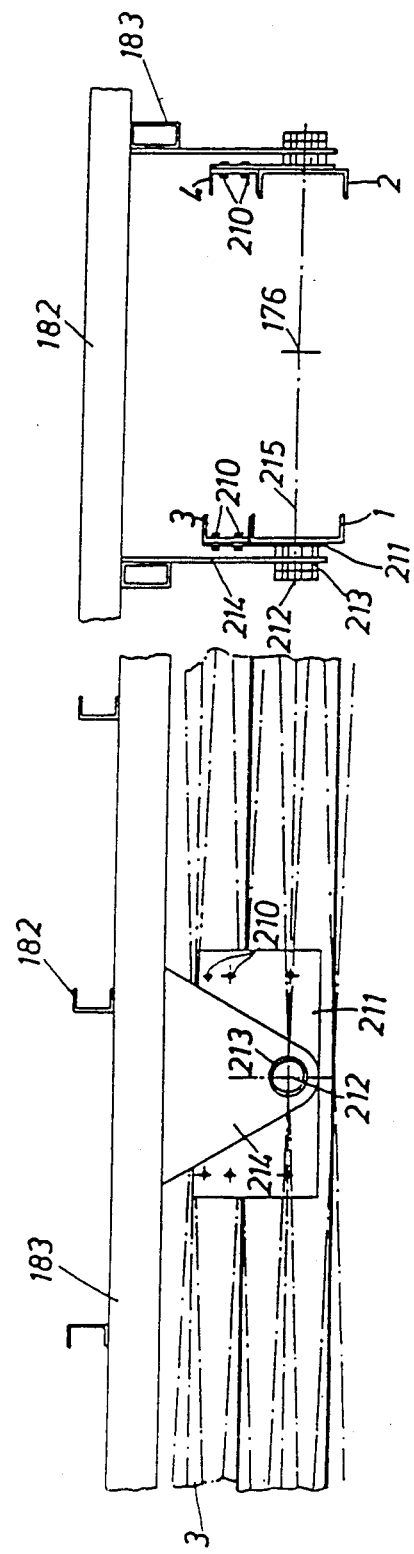

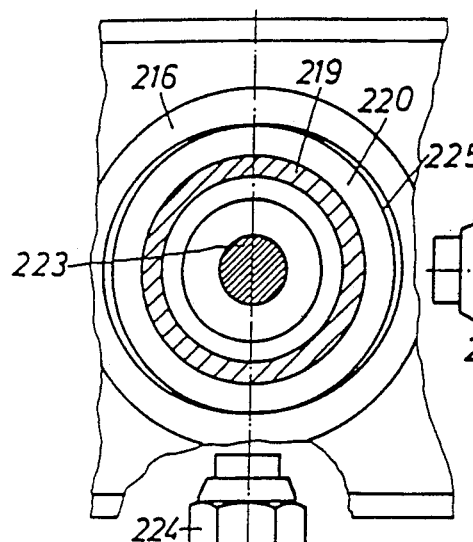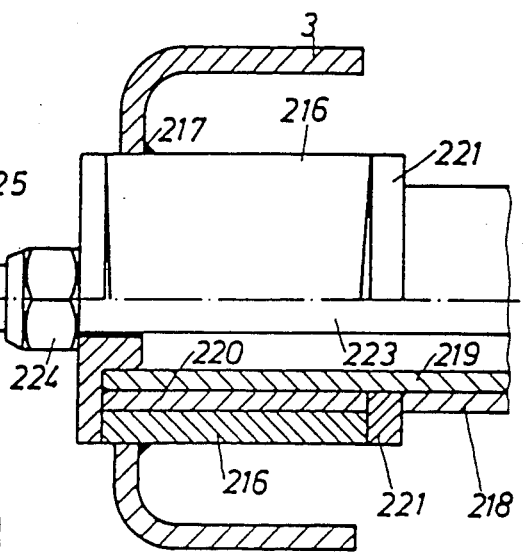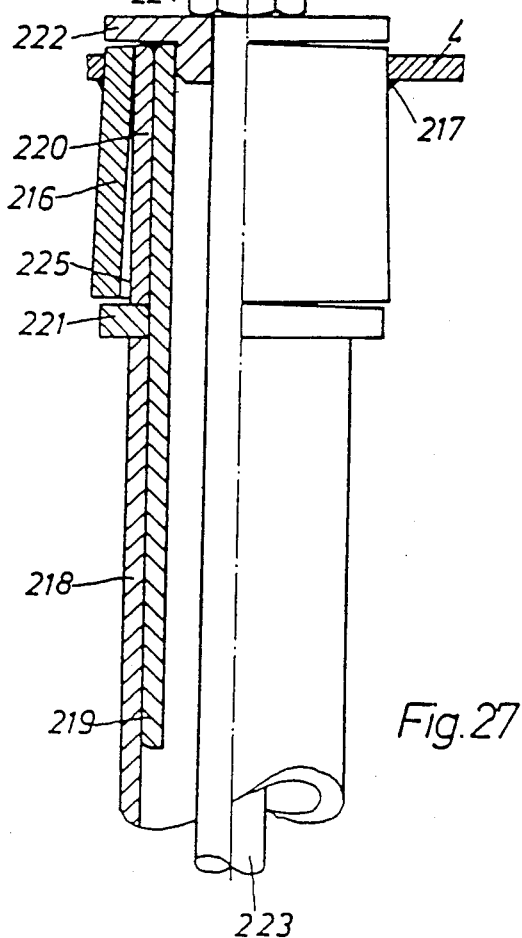

MULTI-AXLE MOTOR VEHICLE WITH A BODY

The invention concerns a multi-axle motor vehicle, in particular commercial vehicles, which has a warp flexible frame, preferably a frame connected with a superimposed assembly frame, and a body with very little warping capability supported on this frame by means of support elements, preferably a body with a bottom construction group, in particular, a body that contains equipment such as a workshop body of a workshop car, in which case a connection that flexibly absorbs vertical and longitudinal forces and allows limited relative movements between the frame and the body is provided in the direction of the longitudinal extension of the vehicle in the middle section of the body between the latter and the frame, and at least one support element is located in at least one additional region shifted in the direction of the longitudinal extension of the vehicle, in which case a side thrust support connection that absorbs transverse forces is provided in at least one region of the body between the latter and the frame.

A multi-axle motor vehicle in which the body is supported on a number of springs and where additional expensive elements are provided for absorbing the forces arising between body and frame, especially during longitudinal and lateral accelerations, including a flexible transverse guide side thrust support connection (DE-OS No. 22 01 339), is known. This familiar arrangement has the disadvantage that it does not take into account the fact that it is only in the neutral phase (neutral axis) that no movements occur, while in this familiar arrangement all the support elements are located in a region in which substantial deformations occur in the vehicle frame. This familiar solution resulted in cracks in the frame and in the region of the body bottom. The transverse guide thrust support connection has a different significance in connection with this body than in connection with the present invention.

A transport device for extremely large and heavy loads, which consists of three individual chassis, each with a caterpillar pair, is also known. The total load is supported on a carrier body, which is in turn supported on three corners, i.e., on each corner on the midpoint of an individual chassis, in which case a sturdy vertical journal is provided at each of these support points, which is supported with a spherical surface against a flat support plate and is surrounded on all sides by a cylindrical guide that absorbs the horizontal forces. Due to the support on the spherical surface, the chassis can swing through a certain angle around the midpoint of the spherical surface (GB-PS No. 1,511,140). Due to the cylindrical guide, which serves to transfer the horizontal forces, the spherical surface cannot ride on the flat surface, but must necessarily slide on it with friction. Under a heavy load this is possible only with the involvement of large forces and thus considerable wear. The point of surface will always be located at the midpoint of the cylindrical guide that absorbs the horizontal forces. In another familiar motor vehicle the bottom construction group of the body is supported at its forward end by means of two spring elements with large compensation paths on the motor vehicle frame and is supported at the rear end with respect to the frame at a third bearing point located in the middle of the vehicle frame and shifted in the longitudinal direction, in the form of a rubber ball-and-socket joint, in which case two fishplates are located between them as an additional bearing point pair between the bottom construction group and vehicle frame (DE-OS No. 29 11 722). The spring elements are indeed deformable, but the deformation occurs under the effect of forces that are conveyed into the bottom construction group of the body and accordingly load the body with forces. The forces introduced on the middle bearing point pair consisting of fishplates are very large due to the design of the connection.

The object of the invention is particularly suited for vehicles with a large axle spacing and for vehicles that must negotiate uneven terrain.

The invention proposes to transfer the load forces from the body as favorably as possible to the frame and to transfer the counter support forces from the frame to the body so that the latter is stressed as little as possible by warping forces, such that the frame can twist when negotiating uneven terrain, but only forces that are as small as possible and resulting from this twisting are transferred to the body. According to the invention concept, in order to solve this problem the instantaneous pole of the relative movement between frame and body, i.e., the point around which the swivelling takes place at a small swivelling angle, is located as precisely as possible in the warping axis of the frame, even if a vehicle component, e.g., the drive shaft or a spare tire, lies in the region in which the warping axis lies.

According to the invention, the support element located in at least one additional region of the body is located at least at one end of the body and has a curved load distribution curve surface connected with the frame, whose axis of curvature lies at least approximately coaxially to the twisting axis of the frame, in which case the side thrust support connection is adjusted to the movement possibility of the support element. Through the transfer of vertical forces to a curved load distribution curve surface it is possible for the frame to effect twisting movements and assume warped positions without transferring asymmetric vertical forces to the body or at least to effect such movements and assume such positions and thus transfer only very slight asymmetric vertical forces to the body. The force of gravity rather rests always vertical to the curved load distribution curve surface, which swivels together with the frame around the warping axis. Several such load distribution curve surfaces can be arranged parallel to each other, distributed over the length of the frame and which are completely identical to each other or are identically equipped in principle, but other support elements can also be provided in other regions. A corresponding proportion of the load is then introduced into the frame through each of these load distribution curve surfaces, such that the load distribution on the frame becomes more uniform and the assembly frame (auxiliary frame), which must be additionally mounted on the normal vehicle frame in order to distribute a load that is introduced only at points, can be kept correspondingly weaker. With such curved load distribution curve surfaces it is possible to arrange the above swivelling axis, around which a certain short frame section is twisted relative to the body, or inversely, around which the body swivels relative to the frame, coaxially to the warping axis of the frame; even if a vehicle component such as the drive shaft or a transmission unit or a fuel tank or the like is located in the region of the frame in which the warping axis lies.

A kinematic inversion, i.e., a flat surface on the frame on which a curved load distribution curve surface connected with the body and arched downward rides, is also conceivable. But then different relative movement conditions result, especially with respect to the displacement of the support point.

On the other hand, because no lateral or component forces can according to the invention be transferred through the curved load distribution curve surfaces, inasmuch as the two surfaces riding on each other can also slide on each other and relative to each other under the effect of lateral forces, an additional lateral force support connection must be provided, through which side thrust forces are transferred between the bottom construction group and the vehicle frame, in which case this side thrust support connection must be adjusted to the design of the support element such that the freedom of movement required for the relative movement that is necessary results and in spite of this a side force support without pinching is possible at any given relative position between vehicle frame and body with respect to each other.

With a design of a support element according to the invention, in which a flat load distribution surface rides on a curved load distribution curve surface, it could be provided as such a side thrust support device, for example, that a gear rack is provided parallel to the flat riding surface and a gear segment is provided parallel to the curved load distribution curve surface, where the teeth of the gear rack and the gear segment engage in each other. However, such an arrangement would be quite expensive and require a lot of maintenance. Another expedient impementation of a side thrust support connection can be developed if a traction roller, e.g., a flyer chain, is provided for taking up the tensile force in each direction, such that a chain is fastened to one side of the body and to the opposite side of the frame and the other chain is fastened precisely the opposite, e.g., a traction element at the left side of the frame and on the right side of the body and the second traction element, inversely, at the left side of the body and the right strut of the frame, in which case each chain is carried over a support surface that is parallel to the load distribution curve path, displaced with respect to the latter so that the neutral axis of the traction element, e.g., the axes of the link pins of the flyer chain lie precisely in the plane of the load distribution curve surface. The two traction elements can be fastened by means of elastic elements or preferably rigidly.

Because an uplift is to be simultaneously avoided, it is expedient in the above side thrust support connections if there is also an arrangement, e.g., a staybolt provided with a pretensioned spring that presses the rolling surface on the load distribution curve path. Such side thrust support connections are expediently located directly adjacent to the support element.

In another implementation of the support element according to the invention, in which a flat rolling surface does not slide on the curved load distribution curve path, but the vertical force is transferred to the load distribution curve path through a roller that is connected with the body and is supported on the curved load distribution curve surface, there are other forms of relative movement between the body and load distribution curve surface, which necessitate a different absorption of the side forces. It should be considered here that the connection provided in the central region of the longitudinal extension of the body between the latter and the frame serves primarily to absorb the vertical forces on each side, such that if an additional connection is provided that converts the side thrust forces into vertical forces, the latter can be taken up by the said connection located in the central region. At least in this sense, a support connected rigidly with the body can be provided as the side thrust support connection, which is capable of swivelling around a support axis arranged at least approximately coaxially to the warping axis on a cross beam located in the frame. This support thus swivels around the warping axis, such that the middle part of this support that is connected with the frame swings parallel to the support roller. The lateral movement of the body with respect to the frame or vice versa is thus converted into a relative vertical movement, which can be absorbed by the connection located in the central region. However, this support can also transfer vertical forces from the body through the support to the support axis and from the latter to the cross beam and thus to the frame. It can thus be provided as a support element according to the invention, provided the condition can be met that the support axis is at least approximately coaxial to the warping axis of a frame, i.e., that for this version of force transfer through the support to a support axis it is necessary that no vehicle component be located in the space in which the warping axis lies.

For absorbing the longitudinal forces that arise during braking and acceleration, parallel to the longitudinal median plane of the vehicle, the connection located in the central region of the longitudinal extension of the body is provided; its design must again be adapted to the conditions of the design of the support element. Expedient implementation forms for such a connection with at least two fishplates on each vehicle side or frame side are indicated in claims 2–4. Another implementation form is indicated in claim 29. This implementation form is essentially simpler, where the decisive concept here again is that the axis around which the swivelling movement is to take place intersects the warping axis of the frame, i.e., that both the axis around which the connecting element swivels and also the warping axis of the frame lie in the identical plane parallel to the frame plane.

Expedient implementations of the individual elements of the invention are given in the subclaims.

The invention is elucidated in greater detail in the following with reference to the implementation examples shown in the drawings.

FIG. 1 shows a perspective overall view of a vehicle frame with a bottom construction group.

FIG. 2 shows a frame with bottom construction group in side view, schematized to some extent in various twisting positions.

FIG. 3 shows a top view on the bottom construction group surface.

FIG. 4 schematically depict a view of the frame according to FIG. 2 in the direction of the longitudinal median axis of the vehicle in a plane in which a load distribution curve path lies.

FIG. 5 shows a view in the same direction as FIG. 4, but on a larger scale and with more details.

Figure 6:
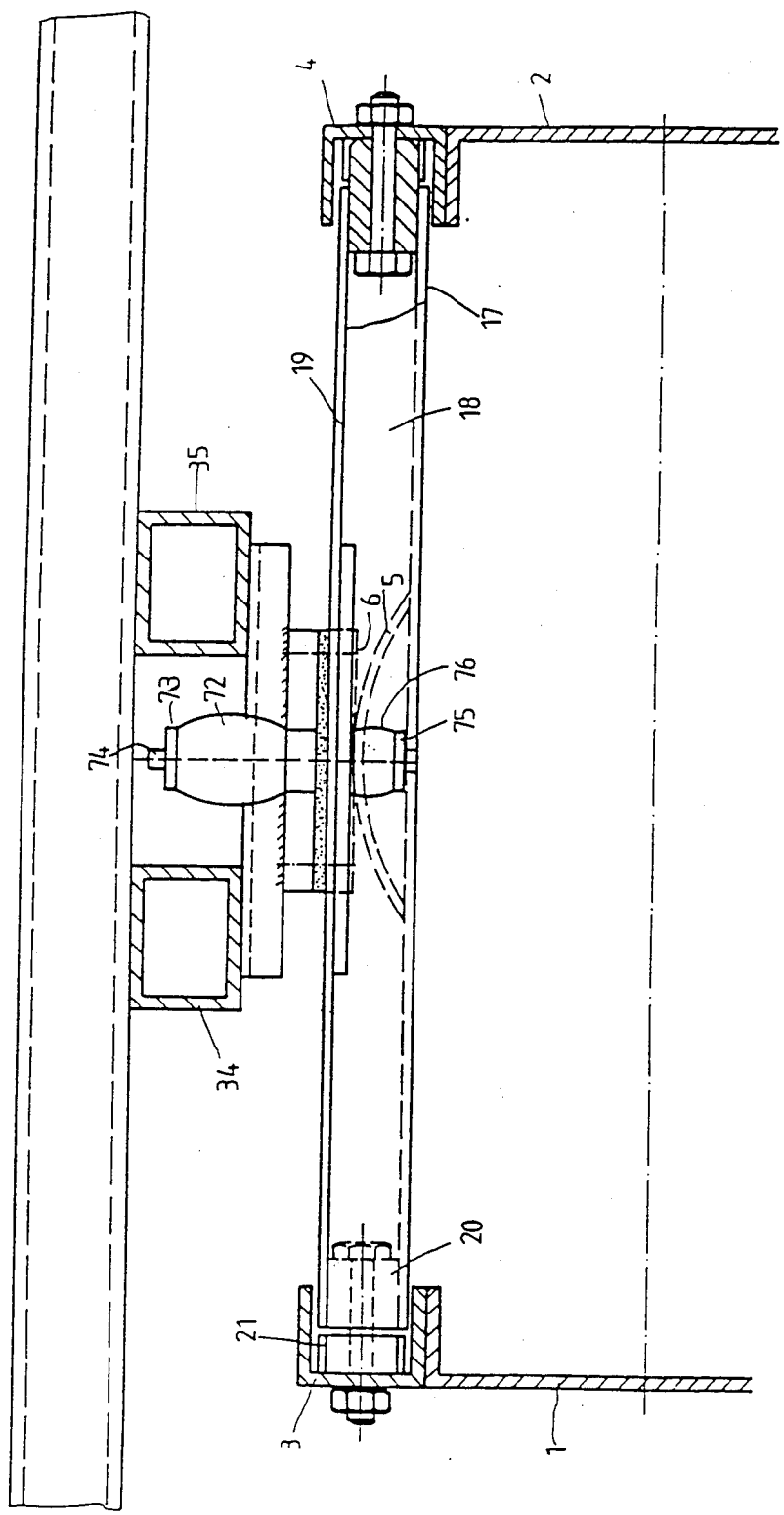

FIG. 6 shows the support situation on a load distribution curve path in the same direction as FIGS. 4 and 5, but in contrast to FIGS. 4 and 5 with proportions to scale.

FIG. 7 shows a side view of FIG. 5 in the direction of sight in the plane of the drawing according to FIG. 5.

FIG. 8 shows a schematic representation with respect to a longitudinal thrust connection device.

Figure 9:
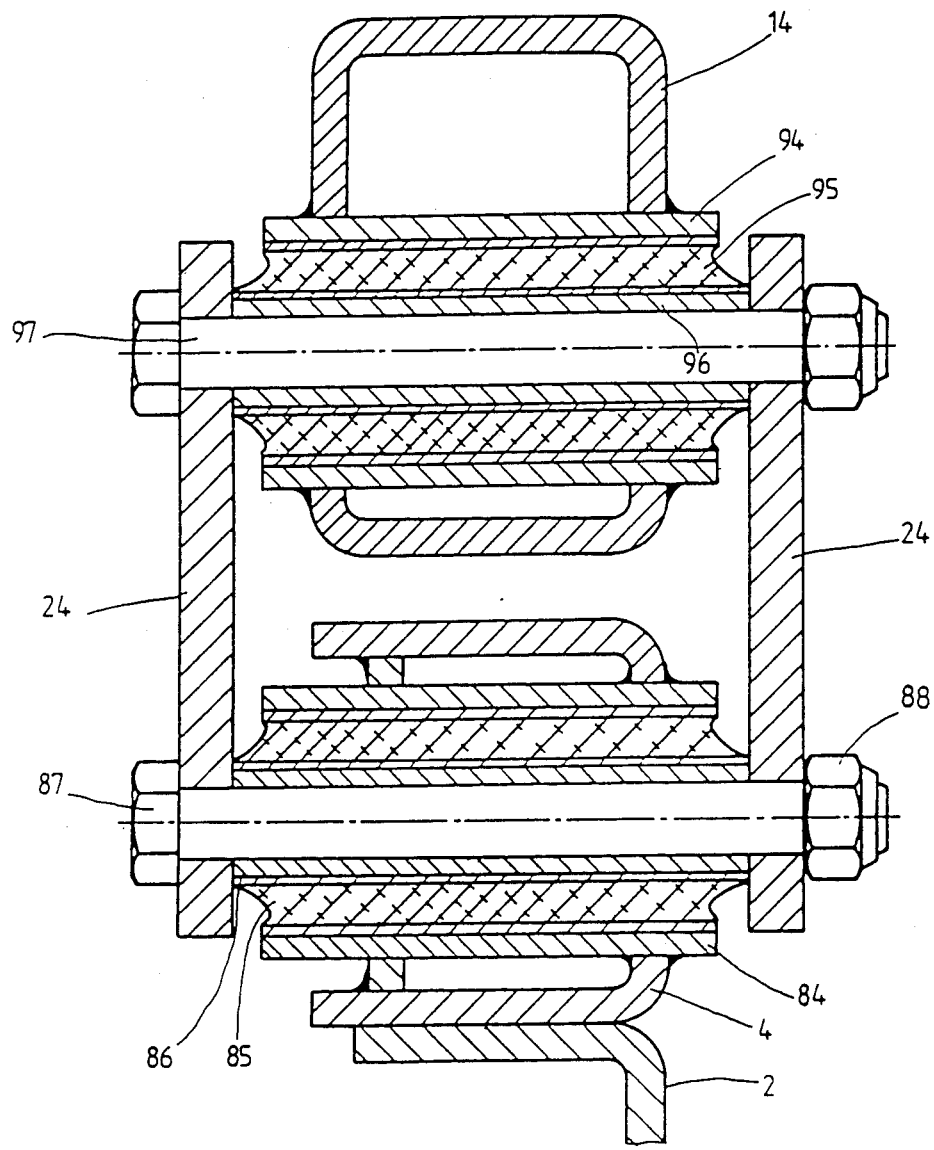

FIG. 9 shows a cut through a fishplate of such a longitudinal thrust connection device.

Figure 10:
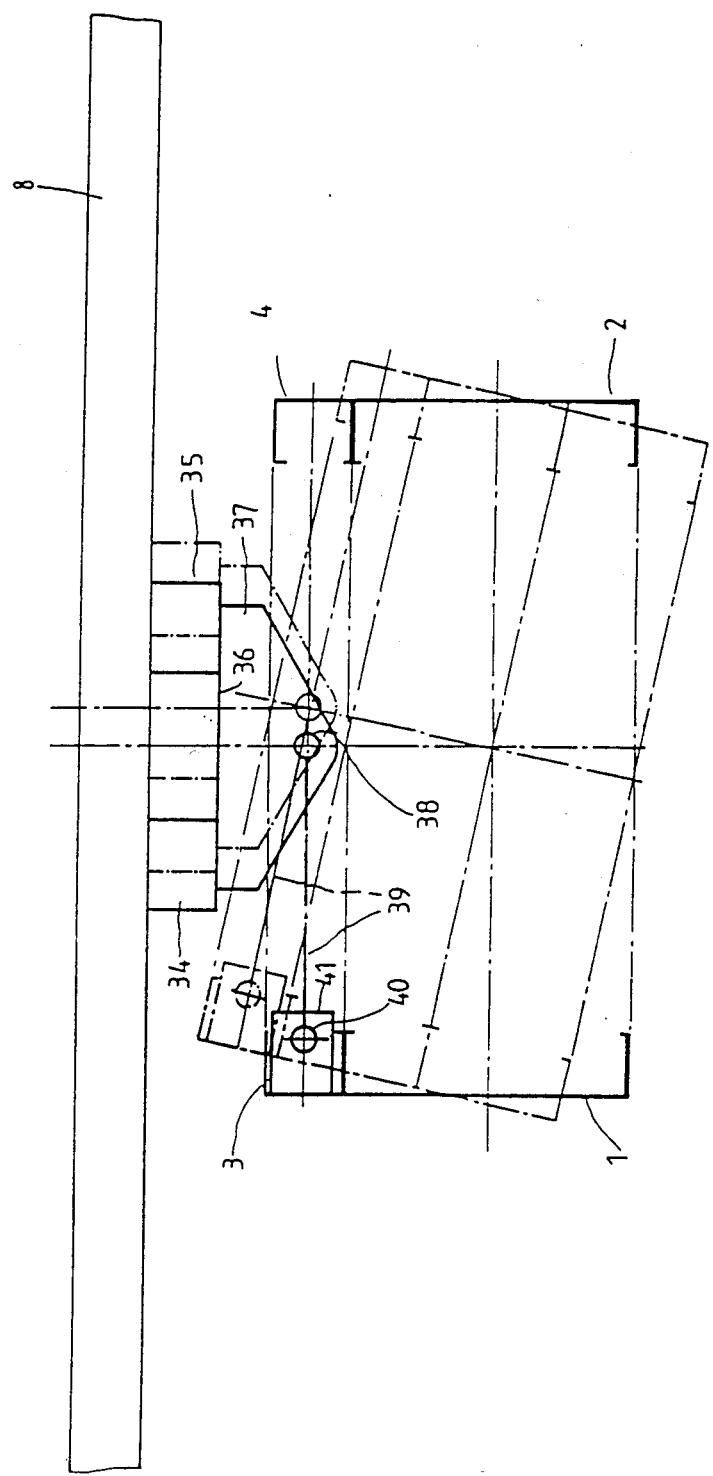

FIG. 10 shows a side thrust connection device, partly schematized.

Figure 11:
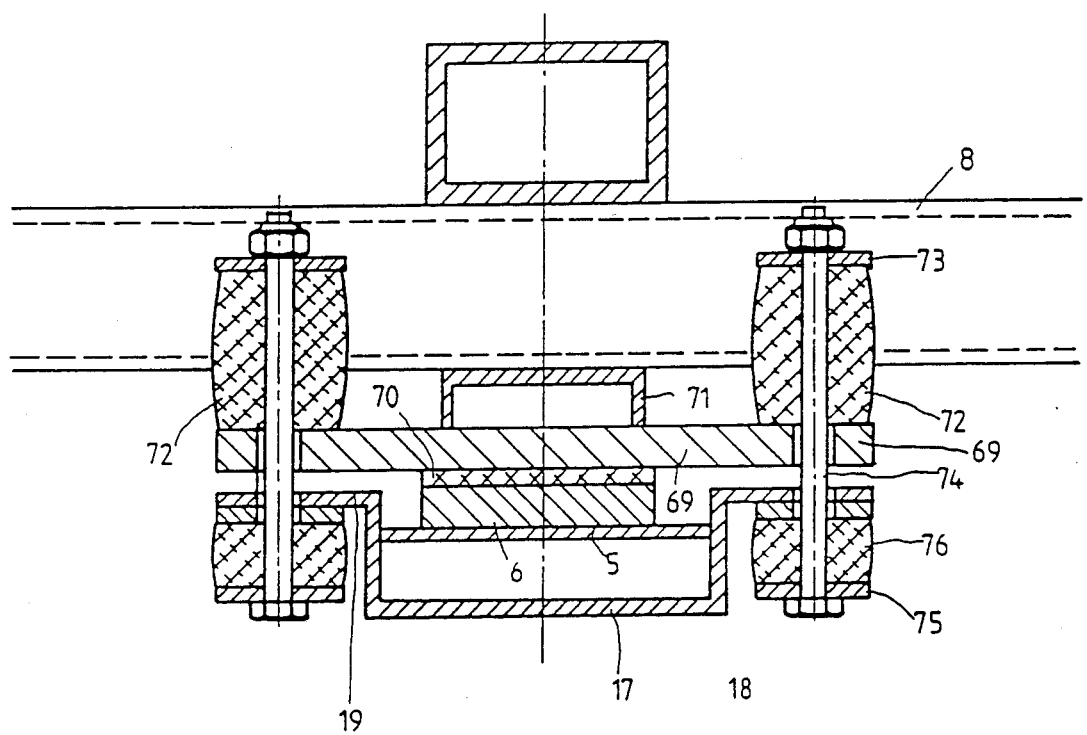

FIG. 11 shows a cut through a device according to FIG. 6, cut in the longitudinal median plane of the vehicle.

Figure 12:
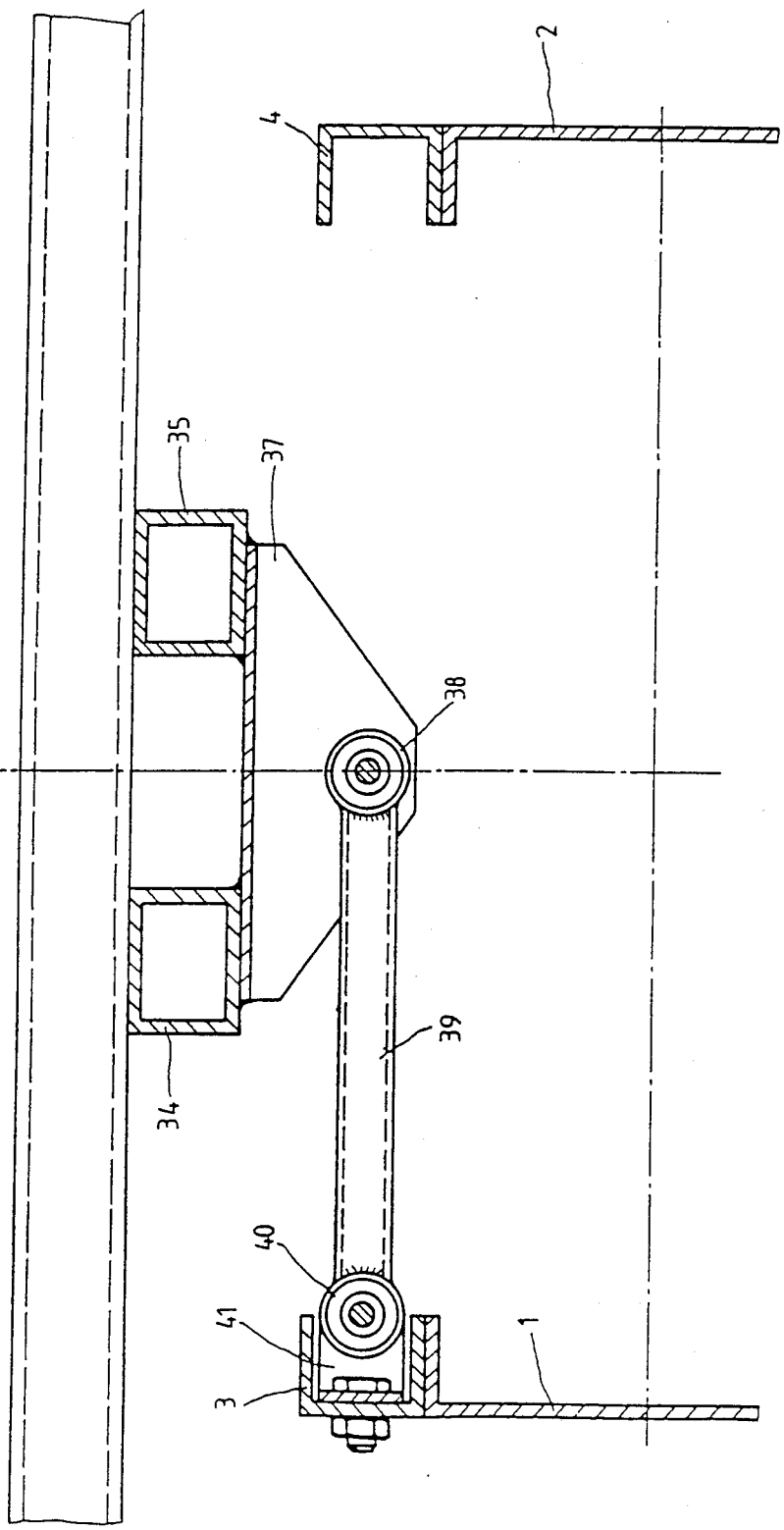

FIG. 12 shows the side thrust connection according to FIG. 10 in a scale representation.

Figure 13:
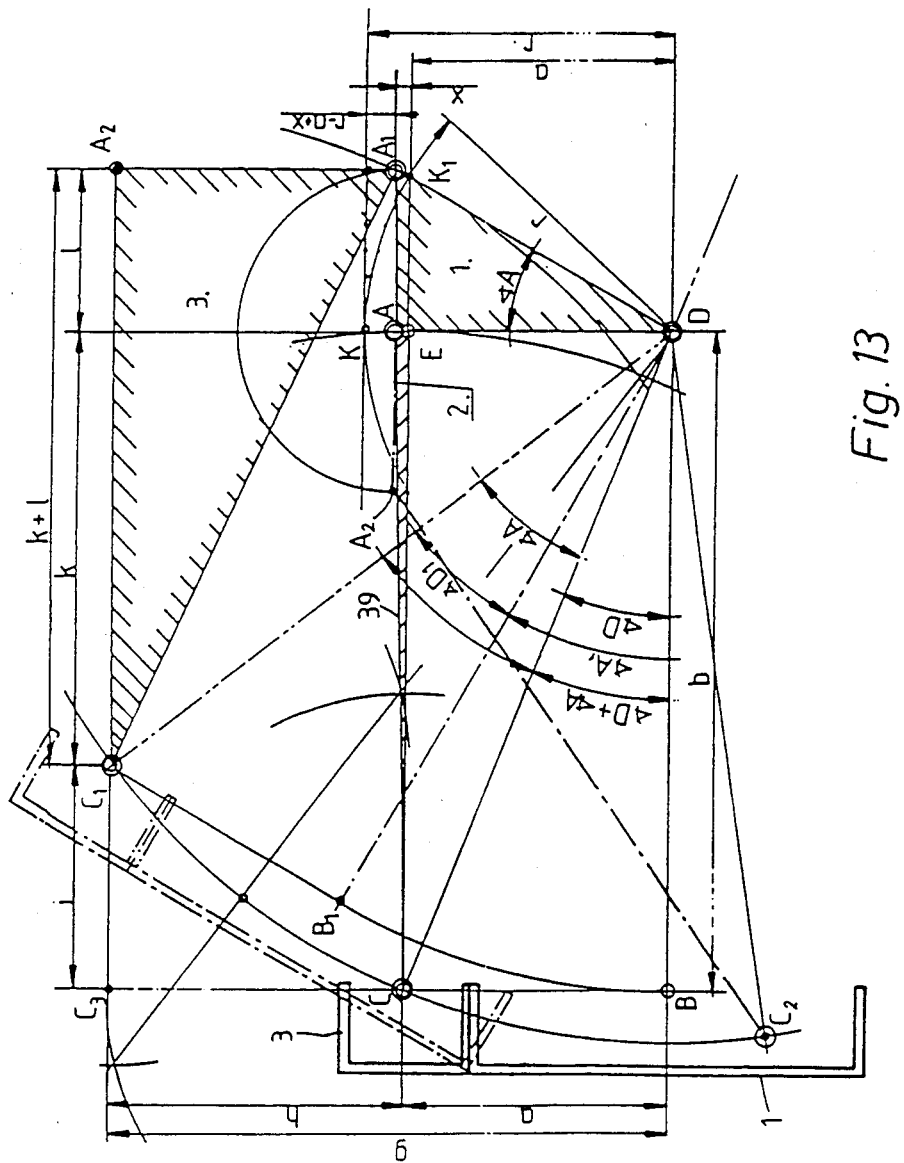

FIG. 13 shows a representation similar to FIG. 10, but with more data for determining the dimensions required.

Figure 14:
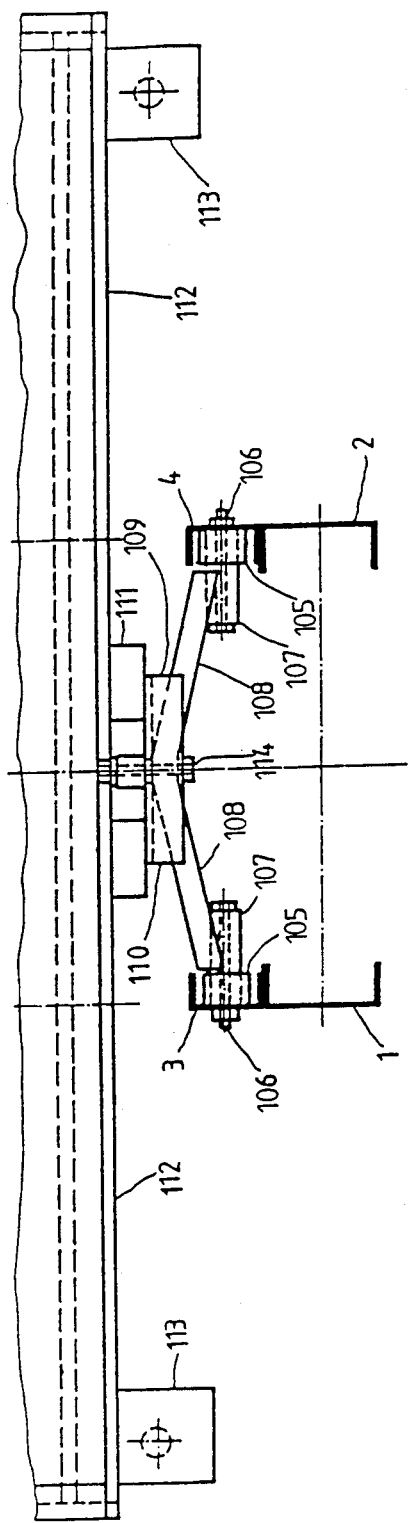

FIG. 14 shows a support element in the direction of sight, parallel to the longitudinal axis of the vehicle, in which the load distribution curve surface is formed on the upper side of a transverse strut arched upward in the middle section.

Figure 15:
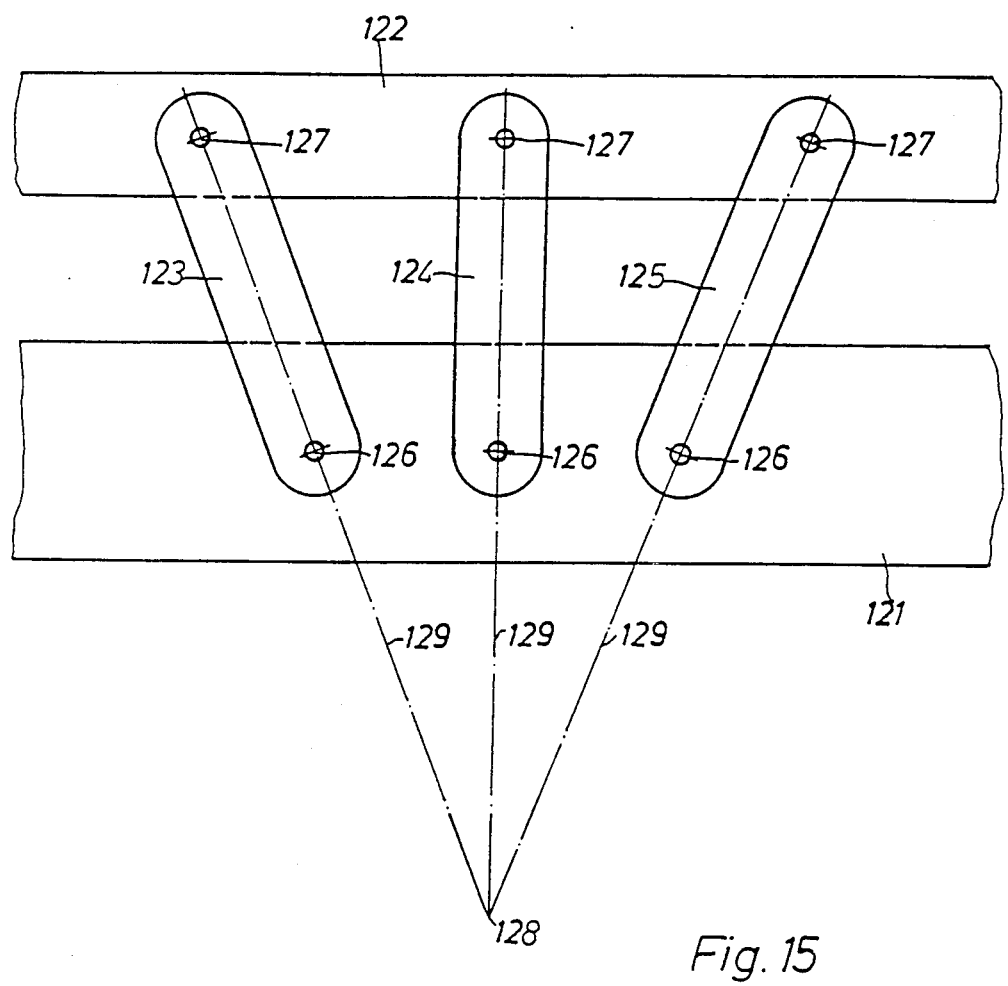
Figure 16:
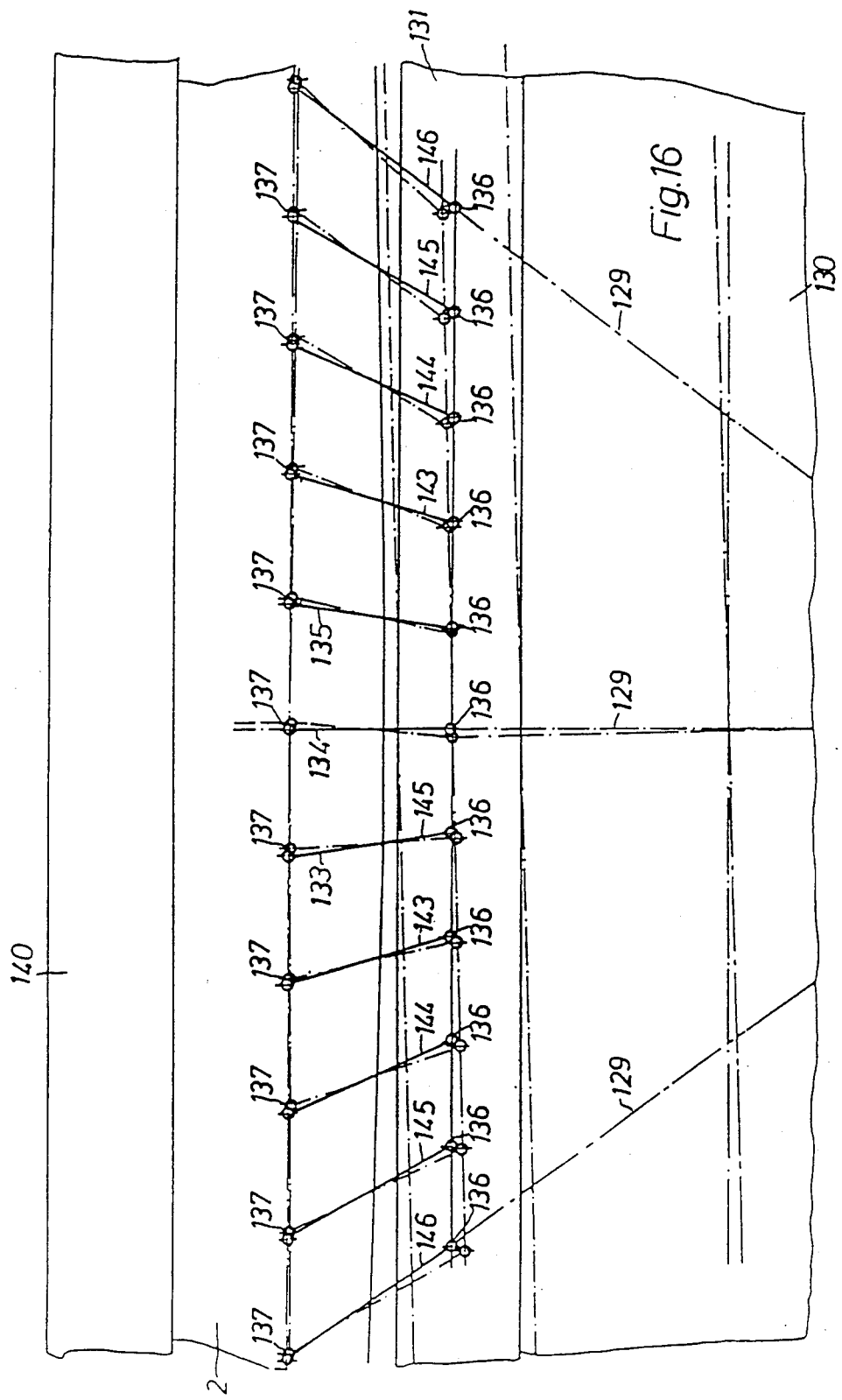

FIGS. 15 and 16 show a connection consisting of a fishplate group and located in the middle section of the longitudinal extension, in a view from the side.

Figure 17:
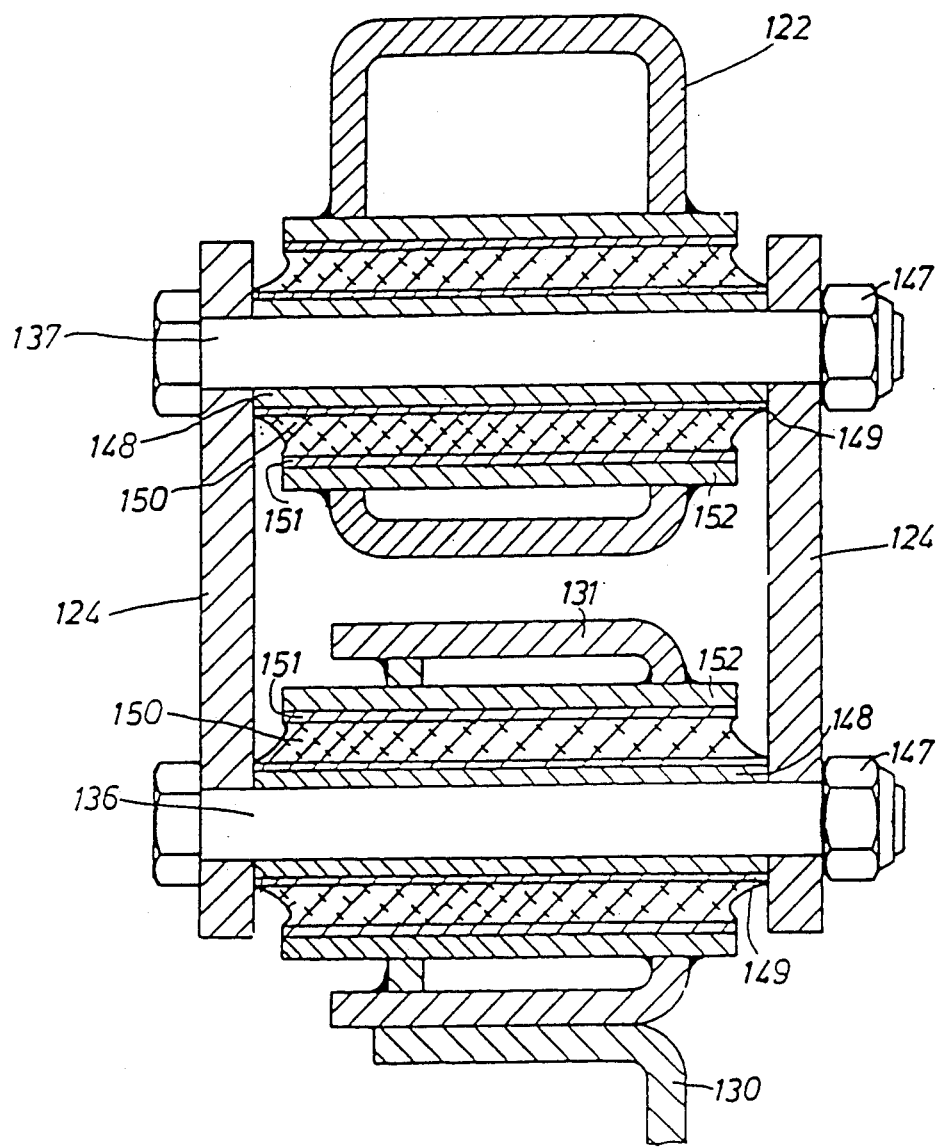

FIG. 17 shows a section in the plane that passes through the axes of the two bolts of a fishplate according to FIG. 16.

FIG. 18 shows a side thrust support device with traction elements in a view parallel to the longitudinal median plane of the vehicle.

FIG. 19 shows a cross section through FIG. 18 in the longitudinal median plane of the vehicle.

Figure 20:
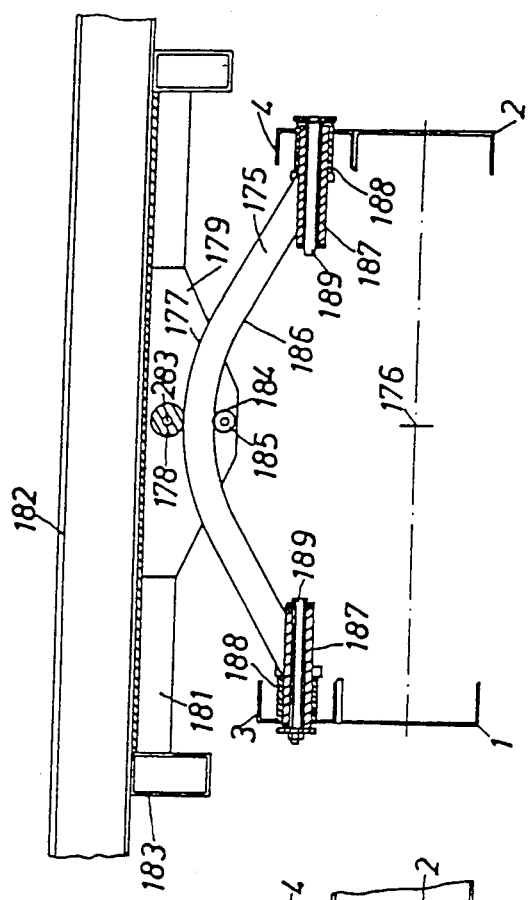

FIG. 20 shows a support element in which the vertical force is transferred through a roller to the load distribution curve surface, in a direction of sight parallel to the longitudinal axis of the vehicle.

Figure 21:
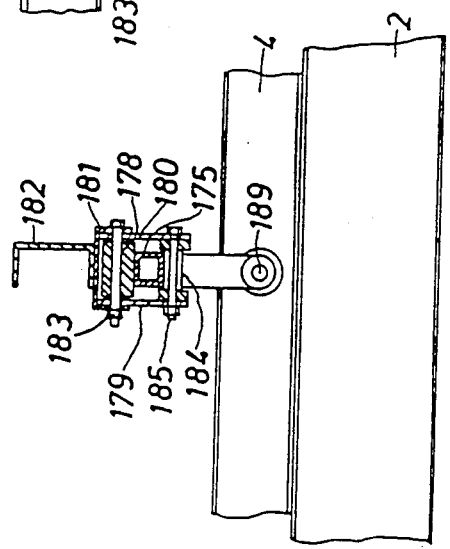

FIG. 21 shows a cross section in the longitudinal median plane of the vehicle through the implementation form according to FIG. 20.

Figures 22, 23:
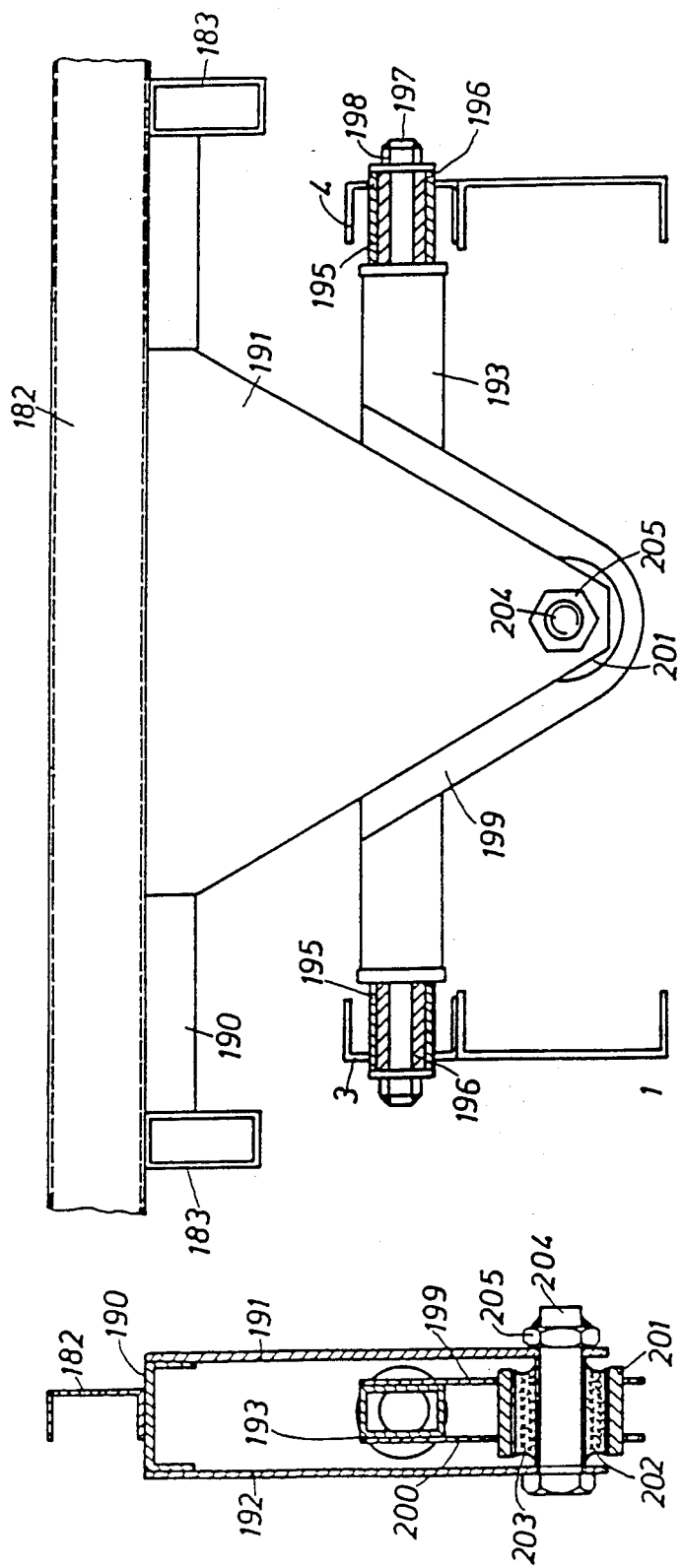

FIG. 22 shows another implementation form of a support element in a view parallel to the longitudinal axis of the vehicle.

FIG. 23 shows a cross section through FIG. 22 in the longitudinal median plane of the vehicle.

Figure 24:
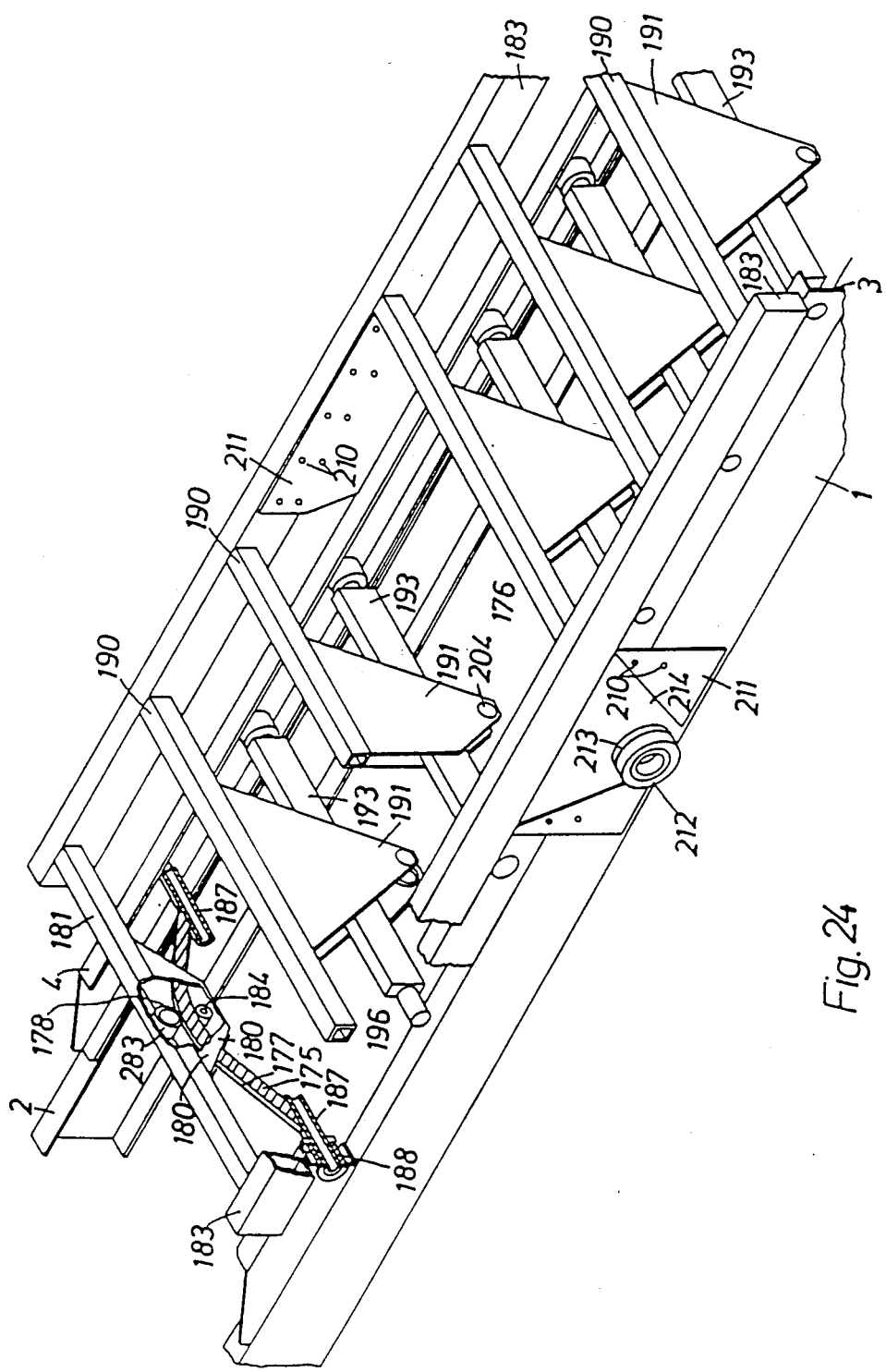

FIG. 24 shows a perspective representation with a support element according to FIGS. 20 and 21 and several support elements according to FIGS. 22 and 23.

FIG. 25 shows in side view a connection device in the middle region of the vehicle body.

FIG. 26 shows a cross section through FIG. 24 in the direction of sight parallel to the longitudinal axis of the vehicle.

FIG. 27 shows a cross section through one end of a cross bar of the frame.

FIG. 28 shows a cross section normal to the cross section according to FIG. 27 of the other end of the same cross bar of the frame.

And FIG. 29 shows a side view, i.e., with direction of sight on the head of the cross bar.

The frame of the vehicle has a left-hand spar web 1 and a right-hand spar web 2, which are connected with each other through the crossbeam 11. A U-shaped assembly frame spar 3 is placed on the left-hand spar web 1 and a similar assembly frame spar 4 is placed on the right-hand spar web 2. The frame 1, 2 with the assembly frame 3, 4 is shown twisted to the right in FIG. 4 in bold lines, in its neutral position in dot-dash lines and twisted to the left in thin solid lines. The load distribution curve path 5 is fastened on a crossbeam. The rolling surfaces 6 can roll on it. This surfaces 6 is located on a support 7 that is shown merely symbolically in FIG. 4 and is represented in a greater height than in reality. The support 7 and the bottom construction group 8 are shown in FIG. 4 only in their neutral position.

It is evident from FIG. 2 that a total of four such support spars 7 are provided with a rolling surface 6 so that the vertical loads are conveyed into the assembly frame at four points, such that a favorable distribution of the load on the length of the vehicle frame results. The bottom construction group 8 itself has a left-hand marginal spar 9 and a right-hand marginal spar 10.

The position (shown in bold lines) in FIG. 4 of the frame 1, 2 with assembly frame 3, 4 corresponds to the top view on the right-hand end in FIG. 2. The position of the left-hand spar web 1, projecting downward at the right-hand end of FIG. 2 corresponds to the thin solid position according to FIG. 4.

It is also evident from FIG. 2 that two side thrust support connections 12 are provided (they are shown merely schematically in FIG. 2) and a longitudinal thrust connection 13 is provided. The latter is fastened to a lower beam 14 that is rigidly connected with the bottom construction group 8. The longitudinal thrust connection 13 and the lower beam 14 are also represented only schematically. The small circles indicate how the individual points of the left-hand assembly frame spar 3 are displaced during the warping of the frame.

It is evident from FIG. 3 how the middle plane 15 of the bottom construction group swings with respect to the longitudinal median plane of the vehicle frame as a result of the riding of the rolling surface 6 on the load distribution curve surface 5.

It is evident from FIG. 5 that the load distribution curve surface 5 is fastened on the bottom surface 17 of a hat section beam that has the side walls 18 and webs 19. This hat section beam 17, 18, 19 is rigidly connected at one end with a thick-wall tube 20 that serves as a supporting journal and is inserted in an additional thick-wall tube 21, which is rigidly welded with the assigned assembly frame spar 3 or 4. The hat section beam 17, 18, 19 can thus rotate with respect to the assembly frame 3, 4. Thus is necessary because during the twisting of the chassis frame 1, 2 the assembly frame 3, 4 is twisted with it, while the hat section beam 17, 18, 19 is to remain in its normal position. The plate on which the rolling surface is formed is supported through an elastic cushion 70 against the mounting plate 69, which is in turn supported through a U-section 71 opposite the bottom construction group 8. In order to avoid a lifting of the rolling surface 6 from the load distribution curve surface 5 and thus also to be able to generate elastic return forces, a rubber spring body 72 is placed on each side on the intermediate plate 69 and an upper covering surface 73 lies against it. This surface 73 has a borehole, through which a bolt 74 passes. This bolt 74 passes with considerable play through a borehole in the intermediate plate 69, in which case the head of this bolt 74 lies against a second covering plate 75, which limits a second elastic rubber intermediate piece 76 that lies against the web 19.

The longitudinal thrust connection shown in FIG. 8 has a middle fishplate 24 and two fishplates 25, 26, 27, 28 and 29 on each side of the vehicle. The upper ends of each fishplate are connected through a metal-rubber link (not shown in FIG. 8) with the lower beam 14. The lower ends are connected through a similar link with the assembly frame spar 3 (or 4 on the other side of the vehicle).

In the neutral position the longitudinal median planes intersect all the fishplates 24–29, in which case each longitudinal median plane passes through the center line of both links, at least approximately in a line of intersection that lies below the boundary of the drawing surface 5 in FIG. 8. If the frame 1, 2 twists with the auxiliary frame 3, 4, the lower linkage points (symbolized by small circles) of the fishplates 24–29 move out in the manner shown in FIG. 8. If a longitudinal thrust force acts on the bottom construction group 8, forces develop as a result of the fishplates 24–29, on the basis of which a moment arises in the bottom construction group around the line in which the longitudinal median planes of the fishplates 24–29 intersect. However, because the bottom construction group cannot swing around this line due to the support in the rolling surfaces 6/load distribution curve paths 5, the vehicle is thus stabilized. The lower beam 14 extends essentially only in the region in which the fishplates 24–29 are articulated.

The cross section (shown in FIG. 9) through the fishplate 24, which runs in a plane perpendicular to the longitudinal axis of the vehicle, illustrates the details better. The outer bush 84 of a rubber-metal bearing is connected with the assembly frame 4. The rubber liner 85 of the rubber-metal bearing is placed on a collet 86, through the longitudinal borehole of which a bolt 87 is inserted. This bolt 87 passes through the two lower boreholes of the two fishplates 24 and is fastened by a nut 88.

A bush 94 is welded into the lower beam or carrier 14. A rubber-metal bearing with a rubber liner 95 is inserted into the bush 94. It in turn rests on the collet 96 that is placed on a second bolt 97 which passes through the upper boreholes of the two fishplates 24.

The principle of support on the load distribution curve path 5 is thus based on the concept of facilitating a movement around the warping axis of the vehicle frame. Instead of support through the rolling surface 6 riding on the load distribution curve path 5, a support to be provided in a flexible coupling, whose axis lies in the warping axis, is not possible because other components of the motor vehicle, possibly the drive shaft, are provided in the region in which the warping axis runs.

An additional undercarrier with the side spars 34 and 35 is provided in the region of the side thrust support connections 12, one of which is shown in FIG. 10 in cross section perpendicular to the longitudinal median plane of the vehicle. The two longitudinal spars 34 and 35 are connected to each other through the cross beam 36, on which two mutually parallel support plates 37 are fastened. Between these two mutually parallel support plates 37 is fastened a metal-rubber articulation 38, in which a transverse guide support strut 39 is flexibly supported. The second end of the latter is supported in a second metal-rubber sleeve articulation 40, which is located between two plates 41 that are welded into the assembly frame spar 3. The metal-rubber sleeve articulations 38 and 40 and the transverse guide thrust bar 39 are shown in FIG. 10 merely symbolically. In FIG. 10 the frame 1, 2 and the assembly frame 3, 4 and the under carrier 34, 35 and the support plates 37 are shown by solid lines in the normal position and by dot-dash lines in the position that these components assume if the vehicle frame is warped as shown in FIG. 4 by solid lines. The spacing of the bottom construction group 8 from the vehicle frame 1, 2 is shown true-to-scale in FIG. 10, i.e., without the superelevation given the support strut 7 in FIGS. 2, 4, 5 and 7.

The dimensions and reference points suitable for determining an expedient length for a transverse guide 39 and for the position of the articulation points 38 and 40 are shown in FIG. 13.

The following are known for this determination:
r = the radius of the load distribution curve surface 5
$a = \overline{BC}$ = the height of the articulation point 40 of the transverse guide thrust bar 39 in the assembly frame 3 above the warping axis D
1 $b = \overline{BD}$ = projection of the transverse guide thrust bar $39 = \overline{CA}$ (dependent on the chassis width).

Determination of the angle $$\sphericalangle D = \sphericalangle BDC \triangleq D_1 = \sphericalangle B_1 DC,$$

$$(\Delta BDC \cong \Delta B_1 DC_1) = \tan^{-1}\frac{a}{b}$$

$$\overline{CD} = \overline{C_1 D}; \overline{CD} = \sqrt{a^2 + b^2}$$

*A = angle of twist/meter of chassis length × distance of middle of transverse guide thrust bar–shear point = center of middle connecting fishplate.
$\sphericalangle B = \sphericalangle B_1 = \sphericalangle DB_1C_1 = 90°$
l = arc length of the load distribution curve surface at $$\sphericalangle A = \frac{r \cdot \pi}{180°} \cdot A$$

$$g = CD \sin(\sphericalangle A + \sphericalangle D) =$$

$$\sqrt{a^2 + b^2} \sin\left(\sphericalangle A + \tan^{-1}\left(\frac{a}{b}\right)\right)$$

$$h = g - a$$

$$k = C_1 D \cdot \cos(\sphericalangle A + \sphericalangle D) =$$

$$\sqrt{a^2 + b^2} \cdot \cos\left(\sphericalangle A + \left(\tan^{-1}\frac{a}{b}\right)\right)$$

$$i = b - k$$

The following are known in the BCA triangle: $\overline{BC} = a = B\ C$ The span $B_1C_1$ in the triangle $B_1C_1A_1$ is known because it is equal to a. In both triangles the length of the transverse guide thrust bar $39 = CA = C_1A_1$.

Furthermore, the spans BA and $B_1A_1$ and all the angles are unknown in both triangles. The length of the transverse link thrust bar $39 = = CA = C_1A_1$ is being sought, as well as the distance x of the articulation point from the load distribution curve path surface 5.

This is found from the following determinations:

(1.) $Jm\Delta DAA_1 = \sphericalangle A = 90°; AA_1 = l = \frac{r \cdot \pi}{180°} \cdot \sphericalangle A$ $$\overline{AD} = \frac{l}{\tan \sphericalangle A} = \frac{\frac{r \cdot \pi}{180°} \cdot \sphericalangle A}{\tan \sphericalangle A}$$

$$AD - a$$

(2.) $Jm\Delta ACE =$ known; $\overline{CE} = b$ and $x$

Transverse link thrust bar = $\overline{CA} = \sqrt{x^2 + b^2}$

-continued $$\angle ACE = \tan^{-1}\frac{x}{b}$$

$$\angle BCA = 90° + \angle ACE$$

3. Control calculation. $Jm\Delta A_1 A_2 C_1 = < A_2 = 90°$;
$A_1 - A_2 = h - x$; $K + 1$, known Transverse link thrust bar, $$\text{warped chassis } C_1 A_1 = \sqrt{(K+l)^2 + (h-x)^2}$$

$$\angle C_1 = \tan^{-1}\frac{h-x}{K+l}$$

$$\angle ADB = 90° + \angle D_1 = \left(\tan^{-1}\frac{h-x}{K+l}\right)$$

4. Angle difference = twisting of the metal-rubber bush =

$$\angle ADB - \angle ACE$$

In FIG. 14 the two spars of the vehicle frame are again designated by 1 and 2 and the two spars of the assembly frame imposed on the vehicle frame, by 3 and 4. A socket 105 is welded into each of the spars 3 and 4 of the assembly frame. It is formed of a section of a thick-walled tube and through its hole a bolt 106 is passed, on the part of which that projects toward the middle of the vehicle a second socket 107 is placed; the latter is rigidly connected with a transverse strut 108. The latter consists of a rectangular tube, the both ends of which are welded with a socket 107 each, and it is curved in the middle zone so that the load distribution curve surface is formed on the surface, on which the flat rolling surface 109 rides. The latter is formed by the lower, i.e., inner wall of the web of a U-section iron 110 that is open to the bottom and is in turn connected through an intermediate construction 111 with the under carrier 112 of the bottom construction group, which is stiffened by the side beam 113.

It is apparent that the construction can also be the inverse, that is, instead of the transverse strut 108 a U-section that is open to the top is provided; a box-like body, which takes the place of the body 109, rides on the web of this U-section.

An elastic support 114 that permits the rolling surface 109 to ride on the upper side of the transverse web 108, but prevents transverse displacements, is provided in the median plane of the transverse web 108, or optionally alongside of it.

The implementation form of a connecting fishplate group with three connecting fishplates, shown in FIG. 15, produces the connection between the longitudinal spar 121 of the frame and the bottom flange 122 of the body. In the normal case the longitudinal spar 121 is the spar of an assembly frame that is placed on a vehicle frame (not shown in FIG. 15). These connecting fishplates 123, 124 and 125 are provided for connection between the longitudinal spar 121 and the bottom flange 122, where each of the connecting fishplates 123, 124 and 125 is supported by means of a bolt 126, which is in turn elastically supported in the longitudinal spar 121, and on the other side by a support bolt 127, where each of the support bolts 127 is elastically supported in the bottom flange 122.

In the FIG. 15 the three fishplates 123, 124 and 125 are shown in the position that they assume if no forces are acting on them. It is evident there that the three longitudinal center lines 129 jointly intersect in a point 128, where a longitudinal center line 129 passes through the axis of a support bolt 126 and also through the axis of a support bolt 127 of the same connecting fishplate 123 or 124 or 125.

If it is to be possible for the bottom flange 122 to approach the longitudinal spar 121 as a result of vertical loads, this occurs through elastic deformation in the elastic bearings of the support bolts 126 and 127. However, if a longitudinal force acts on the bottom flange 122 in its longitudinal direction and a longitudinal force acts in the longitudinal spar 121 in the opposite direction, a displacement can also take place in the periphery of the elastic yield of the bearings of the support bolts 126 and 127. Besides, however, a migration of the center lines from the common point of intersection 128 occurs even with a slight swivelling motion, such that if, for example, a longitudinal force acts toward the right in the drawing in the bottom flange 2, a further shift in the bottom flange 122 to the right in the drawing would then be possible only if the connecting fishplate 125 swings around the support bolt 126 in the clockwise direction and thus the right-hand end of the bottom flange 122 in the drawing approaches the longitudinal spar 121. However, that is not possible because vertical force support or stay elements (not shown in FIG. 15) are provided at a distance from the longitudinal thrust connection shown in FIG. 15 and they prevent a lowering of the bottom flange 122 with respect to the longitudinal spar 121. A longitudinal force absorbing device thus results through the thrust support connection 123, 124, 125, 126 and 127 and it permits only slight relative displacements between bottom flange 122 and longitudinal spar 121.

In the implementation according to FIG. 16 the longitudinal spar 130 of the frame is rigidly connected with the assembly frame 131, in which the support bolt 136 is elastically supported, in which case a connecting fishplate (shown only symbolically as a streak in FIG. 16) 133 or 134 or 135 or 143 or 144 or 145 or 146 is supported on each of the support bolts 136, each of which is supported with its upper end by means of a joint bolt 137 in the bottom flange 122, which is rigidly connected with the bottom part 140 of the vehicle body (not shown).

The positions of the center lines 129 passing through the support bolt axes of the support bolts assigned to each other or the same connecting fishplate, which result during displacement under the action of a force, are shown in FIG. 16 by dot-dash lines.

It is evident from the cross section shown in FIG. 17 that each support bolt 136 or 137 is passed through two coaxial boreholes of two parallel connecting fishplates, which form a fishplate pair, and is designed as a threaded bolt. The fishplate 124 is shown in FIG. 17 as an example. The threaded bolt is fastened by a nut 147, where the two fishplates 124 are pressed by the nut 147 against a metal bush 148, which determines the distance between the two connecting fishplates 124. This metal bush 148 is embedded in the inner metal bush 149 of the rubber-metal joint, which has a rubber cushion bush 150, which is limited toward the outside by a metal bush 151, which rests in the outer bush 152, which is fastened in the assembly frame 131 or the bottom frame 122.

An implementation form is shown in FIGS. 18 and 19, in which an arch-shaped load distribution curve body 163 is supported on the two vehicle frame spars 161 and 162. The load distribution curve surface 164 is formed on the surface of the body 163 and the flat rolling surface 165 is supported and can ride on it. This surface 165 is formed on a load distribution surface plate 166, which is in turn connected with the vehicle body in a manner not shown and it has a support web 167, at least in its central zone, which can be supported with its vertical surface facing the load distribution curve body 163 against the face of the latter for transferring longitudinal forces. A support surface 169 is formed on a support surface body 168.

The flyer chain 170 is connected with the longitudinal spar 161 at its left-hand end in FIG. 18 in a manner not shown in detail and is connected with the vehicle body at its right-hand end in FIG. 18 in a manner not shown in detail. The support surface 169 is set back with respect to the load distribution curve surface 163 by half the thickness of the flyer chain 170, such that the neutral axis, i.e., the axis of the fishplate connecting bolts in the chain 170, lies in the same plane as the load distribution curve surface 164. The support body 168 and thus the support surface 169 are thus sufficiently wide here so that two flyer chains can be supported alongside each other on the support surface 169: besides the flyer chain 170 shown in FIG. 18, a second chain (not shown) that is fastened with its one end at the longitudinal spar 162 of the vehicle frame and with its left-hand end in the drawing at the vehicle body. Both chains can be rigidly connected at both ends with the assigned structural component or optionally be fastened elastically to one or both ends for absorbing shocks.

In the implementation form shown in FIGS. 20 and 21 an assembly frame with the two spars 3 and 4 is in turn placed on the two spars 1 and 2 of the vehicle frame. An arch-shaped load distribution curve surface body 175 is supported in the assembly frame 3, 4. Its middle section is curved in an arc so that the midpoint of the curvature lies in the warping axis 176. A load distribution curve surface 177 is formed on the upper side of the curve surface body 175, on which the roller 178 rides. The latter is supported in a bearing block 179, 180 which is in turn supported in a transverse beam 181 that again in turn is supported at a bottom flange 182 of the body and at two longitudinal spars 183 of the body (no longer shown in FIGS. 20 and 21). The roller 178 is supported by means of a bearing journal 183 in the bearing block 179, 180. In order to prevent a lifting of the roller 178 from the load distribution curve path 177, a second guide roll 184 is provided; it is also supported in the bearing block 179, 180 by means of a second bearing journal 185 and engages under the lower side 186 of the load distribution surface body 175.

The body 175 is rigidly connected with two bearing tubes 187, which are rotatably supported in two outer tubes 188, in which case these outer tubes 188 are each rigidly supported in one of the assembly frame spars 3 and 4. Each bearing journal 189 serves to prevent the tubes 187 and 188 from sliding out of each other. Each of the tubes 187 is swivellably supported in one of the tubes 188 so that the load distribution curve body 175 can swivel around the common axis of the journal 189.

The following consideration is to be the basis for examining the invention: Even if the frame of the vehicle twists due to a lifting of a rear wheel with a simultaneous dropping of the rear wheel on the other side of the vehicle, the warping axis remains unchanged. If the wheel on the other side of the vehicle is raised at the front axle, such as the raised wheel at the rear axle, and vice versa, the other wheel of the front axle drops, the warping axis also remains unchanged and the position of the two frame spars also remains unchanged in a region of the frame. That is, such an axis running perpendicular to the two spars, which intersects the warping axis, remains unchanged in this plane perpendicular to the longitudinal axis of the vehicle, with the result that the warping axis and the said transverse axis remain perpendicular to each other in this point of intersection even with such a warping of the frame, while in all other points of the frame the intersection of such a transverse axis remains at right angles with the warping axis only if the vehicle is standing on a horizontal flat roadway, while during a twisting of the vehicle in all other planes than the afore-mentioned the angle changes with respect to a right angle. If one considers a plane rigidly connected with the vehicle frame above the warping axis, the center line, which lies precisely vertically above the warping axis in the normal position of the chassis on a flat horizontal roadway, will obliquely enclose an angle with the longitudinal median plane of the vehicle, with the result that this center line is shifted from the longitudinal median plane of the vehicle with increasing distance from the first-mentioned plane in which the angle is retained; thus, a spatial "displacement" results. In this first-mentioned plane, in which the right angle is retained between the transverse axis and the warping axis, the fixation should take place through the connection provided in the central region of the body. This normally lies in front of the forward spring bracket of the rear axle because the body is fixed parallel to the frame by this connection; only the slight play of ca. 1 mm or at the most a few millimeters, which is facilitated in the rubber-metal bush, is absorbed. On the other hand, with increasing distance from this plane the displacement can amount to more than 10 mm. The ideal case would be that the body is cardanically suspended only in the point in which the angle between the said transverse axis and the warping axis remains a right angle. This is not possible in practice because (1) the other vehicle components generally lies in this point, and (2) the load must be supported at several points over the length of the body in order to introduce it uniformly into the frame.

In the support element shown in FIGS. 22 and 23 the vehicle frame spars 1 and 2 and the assembly frame spars 3 and 4 and the body spars 183 and the bottom flange 182 of the body are again the same as in FIGS. 20 and 21. In this case a transverse beam or crossmember 190 in the form of a U-section open downward is placed under the bottom flange 182 and two support carrier plates 191 and 192 are placed on it. A crossmember 193 is supported in the assembly frame 3, 4, where two bearing tubes 195 are again fastened in the assembly frame 3, 4; two bearing tubes 196, which are rigidly connected with the crossmember 193, are rotatably supported in them. A tie rod 197, which is fastened by tie rod bolts 198, connects these structural components 193–196 with each other. Two support carrier plates 199 and 200 are fastened at the crossmember 193 and the outer bush 201 of a rubber-metal bearing 201, 202, 203 is supported in them. The elastic rubber packing is designated by 202 here and the inner tube of the elastic rubber-metal bearing 201, 202, 203 is designated by 203. The inner tube 203 is supported on a support journal 204 that is fixed by a nut 205. The axis of the support journal 204 lies precisely in the warping axis. For example, if the frame 1, 2 turns counterclockwise due to a raising of the right rear wheel and a dropping of the left rear wheel, this twisting occurs around the warping axis and thus around the axis of the support journal 204, i.e., the crossmember 193 also swings around the axis of the journal 204 so that its center moves to the left on an arc around the axis of the journal 204. On the other hand, the cross member 190 and the under beam 182 do not change their position. Because the vehicle body and thus the longitudinal spars 183 are held fast by the connection located in the central zone of the body and thus in a region in which the vehicle frame does not change its attitude, the longitudinal spars 183 of the distortion-free body are also held fast.

In the perspective, partially cutaway representation in FIG. 24 a construction is shown in which support elements with rollers 178 according to FIGS. 20 and 21 are located in the forward region of the body and support elements according to FIGS. 22 and 23 in the region adjacent to the connecting located in the central region of the body. It can be seen here that the longitudinal spars 183 of the body always swing around the warping axis 176 in both forms of the support elements.

Supporting the body swivellably around the warping axis 176 is thus an essential basic concept of the invention.

This basic concept is also pursued in the design of the connection between frame and body, located in the midsection of the body, which is to absorb the vertical forces and the longitudinal thrust forces. This is illustrated in greater detail in FIGS. 25 and 26.

A mounting plate 211 is connected by bolts 210 with the spars 3 and 4 of the assembly frame, into which the loading forces are to be introduced. A support journal 212 is rigidly connected with this plate 211. A support tube 213 is rotatably supported on this support journal 212 and it is rigidly connected with a carrier support plate 214, which is in turn rigidly connected with one of the longitudinal spars 183 of the body. The essential feature here is that the common axis 215 of the coaxially arranged support journals 212 intersects the warping axis 176, i.e., in the plane in which the axis 215 and also the warping axis 176 lie the right angle between the axes 215 and 176 does not vary. The positions of the edges of the spars 1 and 3 that the latter assume in the warped position of the frame 1, 2 are shown in FIG. 25 in thin solid lines or dot-dash lines.

A bedding method of a crossbar, which can swivel with respect to the assembly frame, is shown in FIGS. 27–28, in FIG. 27 in horizontal section and in FIG. 28 in vertical section. It should be noted here that during a twisting of the frame the spacing of the spars 1, 2 of the frame from each other and the spacing of the spars of the assembly frame 3, 4 should not change. If an imagined transverse axis that is perpendicular to the spars 3 and 4 is assumed to be at an arbitrary point removed from the fixation point in the normal position of the frame, it intersects the spars 3 and 4 at two definite points. Now if the frame is twisted and a new imaginary line is drawn between these two points of intersection, this imagined line is no longer perpendicular to the spars of the assembly frame. This change in angle must be taken into account if the pivot bearing is formed in a bedding of a swivellable crossbar. On the other hand, the vertical forces should be transferred to as large a surface as possible. A bearing bush 216 is rigidly connected by weld joints 217 with the spars 3 and 4. The crossbar 218, which can thus correspond to the crossbar 193, for example, is to be supported in these bushes 216. An inner bearing tube 219 is provided for this purpose. This tube 219 is bedded in the intermediate support tube 220, which at the same time serves together with the ring 221 as a spacer. A front plate 222 is provided on both sides and the two front plates 222 are connected with each other by a tie rod 223 and by nuts 224. The inner borehole of the tubular bush 216 is cylindrical on the outer side in which the assembly spar 3 or 4 is fastened, but is enlarged ovally from there, so that the inner borehole wall 225 in the horizontal cross section runs conically at the inward-oriented side of the tubular bush 216 in the horizontal plane, such that the cross section perpendicular to the axis at the inner mouth is formed of two half-circles and two mutually parallel wall pieces lying between them. On the other hand, the walls run parallel to each other in the axial vertical section. An angular mobility is thus facilitated in the horizontal; this makes possible a yield without bending stress on the inner tube 219 or the tie rod 223, while in the vertical section the tube 219 is inserted to full length in the tube 220. This implementation form can be provided for both the load distribution bars and the swivellably bedded crossbars and serves in any case for holding the assembly frame spars away from each other.

This construction can be used both in the warping axis pivot bearing system and in the ride-in or roller system. A construction with tube parts is shown in the drawing. Rotating parts can also be used instead of this. It is clearly evident that the bars bedded in this construction can both turn, thus swivel in the bearing and also permit angular changes between the assembly frame spars without stress on the tube or tie rod passing through. In the ride-on roller bars the tubes are short and welded in on the left and right between the U bars in order to keep the load distribution curve free from the tie rod bolts.

We claim:

1. A multi-axle motor vehicle with a warp flexible frame, generally movable with respect to a longitudinal warp axis comprising a frame having a superposed assembly frame attached thereto, and a separate body relatively incapable of twisting and supported on said assembly frame by means of support elements, including a connection that flexibly absorbs vertical forces and longitudinal forces and allows only limited relative movements between the frame and body provided adjacent the center line the body between the body and the assembly frame, at least one support element connected between the assembly frame at at least one additional point along the length of the body and that is disposed in the longitudinal direction of the vehicle and a side thrust support connection that absorbs transverse forces provided in at least one zone of the body between the body and the assembly frame, characterized in that the support element located in an additional point is located at at least one end of the body and has a curved load distribution curve surface connected to the assembly frame, whose axis of curvature lies at least approximately coaxial to the warping axis of the frame, and that the side thrust support connection is adjustable to the movement of the support element and that one of the at least one load distribution surfaces is swivellable around an axis perpendicular to the longitudinal median plane of the vehicle.

2. A multi-axle motor vehicle with a warp flexible frame, generally movable with respect to a longitudinal warp axis comprising a frame having a superposed assembly frame attached thereto, and a separate body relatively incapable of twisting and supported on said assembly frame by means of support elements, including a connection that flexibly absorbs vertical forces and longitudinal forces and allows only limited relative movements between the frame and body provided adjacent the center line the body between the body and the assembly frame, at least one support element connected between the assembly frame at at least one additional point along the length of the body and that is disposed in the longitudinal direction of the vehicle and a side thrust support connection that absorbs transverse forces provided in at least one zone of the body between the body and the assembly frame, characterized in that the support element located in an additional point is located at at least one end of the body and has a curved load distribution curve surface connected to the assembly frame, whose axis of curvature lies at least approximately coaxial to the warping axis of the frame, and that the side thrust support connection is adjustable to the movement of the support element and that said connection which flexibly absorbs vertical and longitudinal forces and is located in the central region of the body (8) between the body (8) and the assembly frame is designed as a longitudinal thrust support connection consisting of at least two connecting fishplates (24, 28) on each side, where each of the connecting fishplates is connected through a swivelling joint, whose axis is perpendicular to the longitudinal median plane of the vehicle, with the assembly frame and through a second swivelling joint with an axis parallel to the axis of the first swivelling joint with the body (8), where in the normal position the said connecting lines, which pass through both joint axes of a connecting fishplate (24 or 28), intersect at least approximately at one point, which lies at a distance from all the connecting fishplates (24 or 28) on the frame side, and that all the swivelling joints are designed as elastic joints that transfer forces within a limited range and allow displacements between the swivelling axis and the connected structural component.

3. Motor vehicle according to claim 2, characterized in that an odd number of connecting fishplates (24, 25, 26, 27, 28, 29, 123, 124, 125, 134, 145, 143, 144, 146) is provided.

4. Motor vehicle according to claim 3, characterized in that all the swivelling axes for a connecting fishplate (24, 25, 26, 27, 28, 29) in the frame (1, 2) or assembly frame (3, 4) and/or all the swivelling axes on the body (8) are located at least approximately on an imaginary straight line running parallel to the longitudinal axis of the vehicle.

5. Motor vehicle according to claim 2, characterized in that each joint has a rubber-metal bush (149, 150, 151) as a bedding bearing for the joint journal.

6. Motor vehicle according to any one of claims 2 through 4 with a crossbar that connects the two spars of the assembly frame, characterized in that a crossmember is swivellably bedded on the crossbar (213, 219) and that the connection between the crossbar (213, 219) with a spar (3 or 4) of the assembly frame is rigid in the vertical direction, but flexible in the horizontal direction.

* * * * *

UNITED STATES PATENT AND TRADEMARK OFFICE
CERTIFICATE OF CORRECTION

PATENT NO. : 4,718,687

DATED : June 14, 1988

INVENTOR(S) : Ernst Hartman and Waldemar Stuhr

It is certified that error appears in the above-identified patent and that said Letters Patent is hereby corrected as shown below:

Column 3, line 31 change "impementation" to --implementation--.

Column 4, line 33 change "2-4" to --2-5--.

Column 4, line 34 change "29" to --6--.

Column 8, line 23 delete "c-".

Column 8, line 24 change "enter" to --center--.

Column 9, line 55 change "These" to --Three--.

Column 14, line 31 after "ride-on" insert --or--.

Column 16, line 24 change "4" to --5--.

Signed and Sealed this

Twenty-seventh Day of December, 1988

*Attest:*

DONALD J. QUIGG

*Attesting Officer*  *Commissioner of Patents and Trademarks*